United States Patent Office 3,420,936
Patented Jan. 7, 1969

3,420,936
COMBATING BACTERIAL AND FUNGAL
PLANT DISEASES WITH HEXACHLORO-
PHENE 2,2' - METHYLENE BIS - (3,4,6-
TRICHLOROPHENOL)
Wilburn T. Wright, Fort Myers, Fla., assignor to Nation-
wide Chemical Corporation, Fort Myers, Fla.
No Drawing. Continuation-in-part of application Ser. No.
429,681, Feb. 1, 1965, which is a continuation-in-part
of application Ser. No. 734,851, May 13, 1958, both
now abandoned. This application Feb. 21, 1967, Ser.
No. 617,480
U.S. Cl. 424—348         10 Claims
Int. Cl. A01n 9/24

ABSTRACT OF THE DISCLOSURE

Bacterial and fungal diseases of field crops, more particularly annual vegetables such as tomatoes and cucumbers, are prevented or controlled by application of hexachlorophene in relatively low concentrations. The agent may be applied by dry dusting or sprayed as a suspension or an emulsion in water or other suitable vehicle, and is applied to the surface of the ground adjacent the emergent stalk as well as to the foliage. The active agent may be formulated with spreading or wetting agents, sticking agents, and other adjuvants, and is compatible with various conventional practices for combined treatment where desired.

---

This application is a continuation-in-part of copending application Ser. No. 429,681, filed Feb. 1, 1965 now abandoned, which in turn, is a continuation-in-part of application Ser. No. 734,851, filed May 13, 1958, now abandoned.

This invention relates to compositions of matter and methods for the combating and controlling of plant diseases caused by bacterial infections. Proposed compositions of matter in the past have included copper and zinc compounds and the relatively expensive antibiotics, for example, with dusting or spraying of the plants to provide a coating, or the use of the antibiotics as systemic bacteriostats. More particularly, this invention relates to the use of hexachlorophene, 2,2-methylene bis-(3,4,6-trichlorophenol) for controlling plant diseases which attack growing crops in the field.

The purpose of this invention is to provide simultaneous control of both foliage diseases which attack the plant and also control of soil-borne diseases which attack the same plants.

Another purpose of this invention could be interpreted as providing a method for field disinfection of a growing crop.

An important object of this invention is to provide novel contact-type nonphytotoxic compositions of matter for combating and controlling diseases or infections of growing plants by the application, of my novel compositions as a spray of dust, to the soil in which the plants are growing and to the plants themselves.

Another purpose of this invention is to provide a novel method of control of serious soil-borne diseases which attack plants whereby an extremely low dosage of the chemical hexachlorophene is used to selectively control certain organisms in the soil which gives an indirect biological control of primary soil-borne plant phathogens.

Another purpose of this invention is to provide control of bacterial diseases which attack plants by the process of killing out the organisms on the plant as well as those in the soil around the plant.

Additionally, an important object of the invention is to provide contact-type compositions of matter for combating and controlling diseases or infections of plants, such as those of tomatoes, peppers and cucumbers, i.e., such serious and devastating diseases and infections as caused by *Xanthomonas vesicatoria,* commonly known as bacterial spot, of tomatoes and sweet and red peppers, and *Pseudomonas lachrymans* and *Peronoplasmapara cubensis* of cucumbers, as examples.

These and other objects and many of the attendant advantages of the invention will be apparent from the following detailed description of the invention, and the accompanying examples.

In many areas, plant diseases are exceptionally severe and cause substantial economic losses. Heretofore, the accepted chemical controls for vegetable plant diseases consisted of materials used at relatively high rates, which, when used as directed, substantially coated the plants with a bacteriostatic or fungistatic deposit.

The accepted, and essentially the only chemical materials recommended to growers for this purpose are given below with the dosages used and concentraitons employed:

"Zineb" (zinc ethylene bis-thiocarbamate) 2 lbs. 65% active per 100 gals. or per acre 1464 p.p.m.

"Tribasic Copper Sulphate" 4 lbs. 53% active per 100 gals. or per acre 2700 p.p.m.

"Maneb" 1½–2 lbs. 75% active per 100 gals. or per acre 1440 p.p.m.

"Captan" 2–4 lbs. 50% active per 100 gals. or per acre 1280 p.p.m.

In contrast thereto, in the instant invention hexachlorophene is used on vegetable and other row crops at the maximum concentration of only 250 p.p.m. or at the maximum dosage level of 85 grams per 100 gals. of water per acre.

Until the present invention, for example, *the only recognized chemical control* of the Rhizoctonia fungus which is perhaps the most severe soil-borne disease of vegetables and other plants was the material pentachloronitro-benzene, called PCNB. This chemical was used at heavy dosages and had to be used at planting time or ahead of planting time because of its inherent phytotoxicity to foilage. In most applications, recommendations called for use of 5 to 10 lbs. of a 75% active product per acre, and in others as much as 50–75 lbs. per acre.

In utilizing the chemical hexachlorophene according to this invention, superior control with no phytotoxicity is gained with dosages as low as or lower than *one ounce* per acre. Indeed, it has been found, as described more fully hereinafter, that as succeedingly heavier dosages are used beyond the stated limits that there is a significant diminution of control of this disease.

In the American Potato Journal, vol. 24, (1947) pp. 35–39, there is described a comparative test conducted on potatoes wherein a number of materials including the compound hexachlorophene were sprayed on potato foliage subjected to late blight disease. In the single experiment using hexachlorophene, the dosage was 2 lbs. per 100 gals. of water per acre or at a concentration of 2560 p.p.m. This is ten times the maximum concentration as well as the maximum dosage used in practicing the instant invention.

In the present invention hexaclorophene is used in such a manner as to control, concurrently, a variety of pathogens which attack plants, and such control is obtained by using a dosage and concentration significantly lower than is indicated by the known properties of the compound. In the utilization of this invention by means of spraying or dusting, thorough coverage of the plant and top of the soil is necessary for best results. Especially in the case of severe bacterial diseases, sources of possible reinfection such as ditch banks and roadways must also be sprayed or dusted. Applications should be made soon after cultivations and as soon as possible after infection periods such as beating rains or strong winds.

Hexachlorophene is quite insoluble in water—approximately 1 part per 100,000. It is a weak acid with a pH of about 5.4. In preparing formulations for agricultural applications according to the present invention, it is desirable that the pH of the formulation be about 6.5±.5 and that the particle size be in the order of ½ to 5 microns.

Several formulations or compositions of matter are suitable for the use of this invention. A dry pulverulent formulation is required, of course, for ground or aerial dusting. Wettable powders, emulsifiable concentrates, and emulsions may be employed for spraying. Aqueous sprays made from emulsifiable concentrates have proven most successful on field-grown vegetables.

In preparing compositions for the usual agricultural applications, the hexachlorophene may be formulated with appropriate spray adjuvants including talc, fuller's earth (such as Diluex A of the Floridan Co., Tallahassee, Fla.), clays, bentonite (such as Pyrax ABB, a pyrophyllite-aluminum silicate of the R. T. Vanderbilt Co., New York, N.Y.) or Attaclay X-250 (Attapulgus), diatomacious earth (as Celite), methyl cellulose, anionic and/or nonionic wetting agents such as sodium lauryl sulfate, alkyl aryl sulfonate, and alkyl aryl polyether alcohol. Examples of the latter are "Triton X-100" (an alkylaryl polyether alcohol) and "Triton X-171" (a blend of alkylaryl polyether alcohol and the sodium salt of alkylaryl polyether sulfate).

For special multipurpose applications, hexachlorophene may be used simultaneously with other parasiticides.

Thus, hexachlorophene may be combined with various fungicidal compounds including zinc ethylene bis-dithiocarbamate and manganous ethylene bis-dithiocarbamate. It may also be combined with various insecticidal compounds such as diethylparanitrophenylthionophosphate and DDT and related compositions, where such combined treatment is indicated.

It has also been found in some applications, that the efficacy of hexachlorophene in regard to bacterial diseases of plants is enhanced by incorporating alkyl aryl sulfonate in an amount of 1.5% by weight of the total in the formulation as the sole wetting agent.

Representative formulas of the composition of this invention are as follows:

FORMULA A

| | Percent by weight |
|---|---|
| Hexachlorophene G-11 | 17½ |
| Alkyl aryl sulfonate | 2½ |
| Diluex A | 50 |
| Pyrax ABB | 30 |
| | 100 |

This formula is found to be especially desirable as a control for *Xanthomonas vesicatoria* infections of tomatoes. The dosage is preferably 1280 p.p.m. of the composition of Formula A in water.

FORMULA B

| | Percent by weight |
|---|---|
| Hexachlorophene G-11 | 20 |
| Xylene (solvent) | 75 |
| Triton X-171 (as an emulsifier) | 5 |
| | 100 |

This formula is suggested where an emulsifiable concentrate is desired (such as when the user does not have a mechanical agitator in the sprayer). Dosage may be in the neighborhood of 1280 p.p.m. in water.

In the compounding of the various ingredients of Formula A, the ingredients may be introduced, in any desired order, to a conventional ribbon blender and blended therein.

Preparation of the composition of Formula B preferably consists of heating the xylene to substantially 120° F., whereupon the Hexachlorophene G-11 is added and the mixture stirred until the latter is substantially dissolved. The solution is then allowed to cool with the emulsifier added with stirring until it has thoroughly mixed therewith.

FORMULA C

Soil treater dust

| | Parts by weight, percent |
|---|---|
| Hexachlorophene | 0.75 |
| Captan [1] | 6.00 |
| Inert (equal parts of Barden clay and calcium carbonate) | 93.25 |
| | 100.00 |

[1] Folpet at 3.00% may be substituted for Captan.

This dust is used at 3 lbs. to 35 lbs. an acre with the lowest range being used for hopper box seed treatments on cotton and other seed; intermediate amounts used for in-furrow applications at planting time; and heaviest rates being used for dense foliage treatment and to also get the effect on the soil. All materials except the inert diluents in this dust are ground to a particle size of ½-5 microns. The ingredients are weighed and blended thoroughly in conventional dust blending equipment. The formulation has a pH between 7.5 and 8.0.

FORMULA D

| | Parts by weight, percent |
|---|---|
| Hexachlorophene | 75 |
| Aerosol OTB (a proprietary wetting agent of American Cyanamid Co.) | 2 |
| Calcium hydroxide | 8 |
| Barden clay | 15 |
| | 100 |

The ingredients are blended together in a conventional dust blender and then ground in an air atrition mill to a particle size of ½ to 5 microns. Where 100 gals. of spray is used per acre such as on vegetables, a concentration of 2 ozs. of this 75% wettable powder per 100 gals. would give a dosage of 1½ ozs. hexachlorophene per acre.

FORMULA E

An emulsifiable concentrate formulation utilizing a multisolvent system which has superior physical qualities and outstanding performance in the field as follows:

| | Part by volume, percent |
|---|---|
| Hexachlorophene | 27 |
| Isobornyl acetate | 20 |
| Cottonseed oil | 34 |
| Methanol | 15 |
| Gafac RE610 [2] | 1 |
| Gafac RM 710 [2] | 2 |
| N-butyl acetate | 1 |
| | 100 |

[2] Proprietary phosphate ester type emulsifiers manufactured by General Aniline & Film, New York, N.Y.

The dosage generally found applicable for use on vegetables of this liquid concentrate is ¼ pint per 100 gals. of water. On some diseases and on citrus a rate of ½ pint per 100 gals. is necessary.

FORMULA F

Another formulation utilizing the maximum toxicant level is given below.

| | Parts by volume, percent |
|---|---|
| Hexachlorophene | 55 |
| Iso-bornyl acetate | 16 |
| Acetone | ³ 20 |
| Gafac RM710 | 15 |

³ Reduced to 14% when heated.

The ranges of practical percentages of ingredients are as follows:

| | Parts by volume, percent |
|---|---|
| Hexachlorophene | 10.0–55.0 |
| Iso-bornyl acetate | 10.0–50.0 |
| Cottonseed oil | 5.0–45.0 |
| Methanol | 5.0–30.0 |
| Acetone | 5.0–25.0 |
| N-butyl acetate | 1.0–8.0 |
| Gafac RM710 | 2.0–15.0 |
| Gafac RE610 | 1.0–8.0 |
| Triton X-100 | 1.0–7.0 |

These formulations can be produced with several liquid vehicle combinations utilizing either methanol or acetone or substitutes such as ethyl alcohol, isopropyl alcohol, butyl alcohol, etc. plus iso-bornyl acetate. Where it is desirable to use cottonseed oil as a cosolvent, other drying vegetable oils can be substituted, such as corn oil, soybean oil, peanut oil, linseed oil. Other emulsifiers may be substituted for those listed, with amounts varying according to formulation desired.

In the control of *Xanthomonas vesicatoria* on tomatoes and peppers the recommended spray contains substantially one ounce to three oz. of hexachlorophene to 100 gallons of water, to be applied first when the first true leaves appear with repeats every five days or oftener if severe conditions warrant until seedlings are transplanted. Applications should be made after cultivation and as soon as possible after infection periods (as after a beating rain). For the control of *Pseudomonas lachrymans* on cucumbers, use at the same rate as recommended last above and apply when the disease first appears (characterized by angular leaf spots) and when weather conditions are favorable to an outbreak of disease (as during hot humid weather or prolonged rains).

Since serious infection results almost always after a rain and particularly after a rain followed by hot humid weather, it is important that the plants, particularly the undersides of the leaves, be treated, such as by spraying, and that the surface of the soil below the plants be covered with a coating of the applied composition of matter, which may be heavy enough to percolate to a maximum of four inches below the surface of the soil. It is also important that, after cultivation of the soil, a coating of the composition of matter be applied to the surface of the soil and, preferably, to the plants as well, since cultivation and air currents sometimes cause bacteria-laden dust or soil to be projected upon low-growing plants during cultivation.

The importance of control of the harmful bacteria in the surface layer of soil not only immediately surrounding the growing plants but also in borders of fields surrounding the plants and along adjacent road sides and the like has been demonstrated by my investigations and experiments.

A further unexpected feature of this invention is that control of the Rhizoctonia fungus may be gained without the active ingredient coming in direct contact with the pathogen. This disease is most pathogenic when soil moisture is present at a level of 30–45%. It attacks the stalk of plants such as cotton and pepper at or below the soil level; it also attacks shallow roots and root hairs. In dry weather it may attack deeper roots. The physical movement of the exceptionally low dosage of the insoluble-in-water hexachlorophene is very slight downward. Hexacholorophene even at the low dosage employed kills gram-positive type bacterii in the upper soil layer which are known to be antagonistic to the beneficial fungus Trichoderma Viride which in turn is known antagonist of Rhizoctonia. As the colonies of Trichoderma multiply, some movement is gained and such colonies spread out to kill the *Rhizoctonia pathogen.* Such exceptional control gained in the field under natural conditions at dosages of one ounce per acre, is in marked contrast to the results of laboratory tests wherein no direct control was effected, even at concentrations as high as 2500 p.p.m.

It is generally accepted among phytopathologists that the biological properties of a chemical compound cannot be predicted from its structural formula nor can its utility as a control agent for plant pathogens or insects in one field be predicted from its efficacy or lack thereof in another field. Similarly, there is no established or even generally accepted correlation between the results of in vitro tests on a laboratory scale under controlled conditions with a given material and the effectiveness of the same material when actually tested on plants growing outdoors under natural conditions especially in respect of soil and weather. This problem is reviewed in considerable detail by George A. Zentmyer in his article, "A Laboratory Method for Testing Soil Fungicides with *Phytophthora cinnamoni* as Test Organisms," Phytopathology, 45 (7), 1955. Further reviews of this problem appear in "Evaluation of Fungicides in the Laboratory," by S. E. A. McCallan, Plant Pathology Problems and Progress, 1908–1958.

When such tests are conducted, as they must, under entirely natural conditions, the results will be affected in one way or another by temperatures, humidity or actual rainfall, soil conditions, inoculum potential and the like.

Thus it has been reported that the application of hexachlorophene to the roots of barley seedlings and cucumber seedlings growing in Petri dishes under laboratory conditions caused significant repression of root growth, although there was no discernable adverse effect upon seed germination. ("Action of Hexachlorophene on Plant Roots," by A. G. Norman, Antibiotics and Chemotherapy, vol. X, No. 11, pp. 675–681.)

Based upon these laboratory observations the author concludes "Hexachlorophene is, therefore, unsuited for treatment of roots to repress surface flora. The hexachlorophene is rapidly bound on the root surfaces causing irreparable injury."

Contrary to such observations and recommendations based solely upon in vitro laboratory techniques, it has been found in actual practice under field conditions that the application of hexachlorophene to the ground around the stem and immediately over the area underlain by the plant roots is beneficial to the growth of the plants so treated. The results of such field tests are set out below in Examples 5 and 6. In Example 9, there was a marked increase in plant growth and yield resulting from a single application of hexachlorophene to the soil during the transplanting of the young pepper plants.

If no disease activity occurs in tests, unsprayed plants generally yield as well as those treated. When symptoms of foliage diseases are absent, in all treatments of a test, including unsprayed, consistent yield increases derived from chemical treatments are deemed to be caused by either hormone action or by control of soil-borne diseases which attack the roots or stalk. Evidence of such diseases are ordinarily invisible unless plants are pulled and examined.

Even though some skilled in the art have thought yield increases derived from the use of this invention were caused by hormone action, examination of plants where growth responses and/or yield increases were noted from the use of the invention always reveals a reduction in attack from the soil-borne diseases and especially Rhizoctonia. Generally yield increases, even in the absence of foliage diseases, from the use of the invention average at least 10%. Frequently the use of this invention in its fullest extent results in yields many times the yield of unsprayed or of any other treatment. Such tremendous yield increases generally occur when severe conditions of multiple diseases occur, but occasionally a specific disease can be severe enough where control from the use of this invention causes yield increases many times that of untreated or of ineffective treatments.

The following examples are illustrative of specific disease control as well as total effects. Examples are also given of failures where limitations of the invention were exceeded.

EXAMPLE NO. 1

This test shows the effect of control of bacterial spot on bell peppers with hexachlorophene at 250 p.p.m. concentration.

Treatment:                                             Average number of spots per plant
  Hexachlorophene at 250 p.p.m. _____   4.5
  Streptomycin 100 p.p.m. plus Tribasic copper
    sulphate 4#/100 gals. _____      6.6
  Unsprayed _____       11.3
  Sprayed with water _____       12.5

Plots were single rows ten feet long replicated three times. Seven applications of treatments were made at approximately five day intervals.

EXAMPLE NO. 2

The following test on bell pepper shows response in yield gained with hexachlorophene sprayed on a season long schedule when no foliage disease was present. Yield increase from copper treatment was due primarily to nutritional value on copper-deficient soil.

Treatment:                                             Average yield in lbs per plot
  Hexachlorophene 2 oz. per 100 gals./acre ____   475
  Tribasic copper sulphate 4# per 100 gals./
    acre _____      427
  No treatment (insecticide only) _____    292

Plots were 3 rows wide, 32 ft. long and replicated three times. Sixteen applications of materials were made.

EXAMPLE NO. 3

This test is an example of the multiple effects of the invention. Downy mildew (*Peronospora cubensis*) a foliage fungus disease was so severe that unsprayed vines failed to yield. Data given below show yield increase over standard downy mildew control (Zineb) plus a highly significant decrease in number of fruit rotted per acre. Fruit rotting was caused by Rhizoctonia, the soil-borne fungus.

| Treatment | Yield in bu./acre | No. of rotted fruit per acre |
|---|---|---|
| Hexachlorophene 2 oz. per 100 gal. water/acre | 546 | 384 |
| Zineb 2 lbs. per 100 gals. water/acre | 445 | 3,712 |
| Unsprayed | | |

Plots were 3 rows wide and 60 ft. long (approximately 1/100 of an acre) and were replicated four times. Sprays were applied twice weekly with a total of 13 applications being applied.

EXAMPLE NO. 4

This test shows the relative efficiency of two formulations of hexachlorophene in control of downy mildew of cucumbers.

Treatment:                                             Average number of lesions per plot
  No spray _____      2660
  Hexachlorophene at 160 p.p.m. in wettable
    powder formulation _____      1480
  Hexachlorophene at 96 p.p.m. in emulsifiable
    concentrate _____      112

Counts were made after seven applications of treatments at twice weekly intervals.

EXAMPLE NO. 5

This test is an example of the effect of the invention in increasing the stand of seedling beans when they were attacked by Rhizoctonia.

Treatment:                                             Average percent stand at bloom
  Check _____      52.7
  Hexachlorophene at 125 p.p.m. sprayed 4 times
    beginning at emergence _____      73.2
  Hexachlorophene at 125 p.p.m. sprayed in furrow at planting plus 4 times as in #2 _____   75.0
  Tetramethyl thiuram di-sulfide (thylate) at
    1660 p.p.m. sprayed as in #2 _____     43.5

100 pinto beans used per each of four replicates per treatment.

EXAMPLE NO. 6

In a test to determine the effect of hexachlorophene on stands of seven different vegetables, a concentration of 250 p.p.m. was sprayed preemergence on top of the seed row and repeated four times after emergence on snap beans, lima beans, tomatoes, peppers, cucumbers, cabbage and watermelons. Results are given for all vegetables combined even though some were not affected by the Rhizoctonia attack.

| Treatment | Total damping-off | Good plants | Average percent damping off |
|---|---|---|---|
| Hexachlorophene at 250 p.p.m. | 48 | 492 | 6.85 |
| Thylate (tetramethyl thiuram di-sulfide) at 1,660 p.p.m. | 108 | 322 | 15.5 |
| Check | 109 | 335 | 15.6 |

Vegetables were planted with 100 counted seeds of each vegetable being planted. Effect of chemical treatments were noted at emergence on May 8, 9 and 10. Last application was made on May 20. Stands were counted on June 3.

EXAMPLE NO. 7

On Nov. 11, and again on Nov. 14, 1957, a 20 ft. portion of a row of Marketer variety cucumbers, was sprayed with a concentration of 250 p.p.m. of hexachlorophene. The entire field was being sprayed with Zineb at 2 lbs. per 100 gals. on a five day schedule during this period.

On Nov. 24, the plot was examined. It was noted that downy mildew disease (*Peronospora cubensis*) was completely controlled on the 20 ft. plot sprayed with the hexachlorophene at 250 p.p.m. and that vines were much greener and more vigorous than surrounding vines that were sprayed with Zineb alone.

The following examples are illustrative of the amounts of hexachlorophene necessary to obtain results consistent with proper usage of the invention.

EXAMPLE NO. 8

This test shows the increased yield of pepper gained with the invention and also shows the limitation of dosage necessary to obtain such yield. Twelve applications of treatments were applied to foliage on schedule.

Materials and concentration                            Yield in lbs.
  per 100 gals./acre:                                  per plot
  Untreated _____      85.27
  Hexachlorophene at 4 oz. _____      82.53
  Hexachlorophene at 3 oz. (85 grams) _____     106.46
  Hexachlorophene at 3 oz. plus Zineb 1.5 lbs.   100.77

EXAMPLE NO. 9

This test also done on pepper as in Example No. 8 shows the yield increase resulting from *one* application of Hexachlorophene at 3 oz. (85 grams) per acre applied to soil during transplanting of pepper.

| Materials and quantity applied per row acre: | Yield in lbs. per plot |
|---|---|
| Untreated | 167.31 |
| PCNB 85% 4 lbs./Captan 50% 4 lbs. | 226.06 |
| Hexachlorophene 3 oz. | 239.67 |
| Soil fumigant Mylone 60 lbs. (applied earlier) | 201.37 |
| Soil fumigant Vapam 20 gals. (injected earlier) | 156.62 |

EXAMPLE NO. 10

Another test on pepper shows the yield gained with Hexachlorophene at the rate of 1.6 oz. (45 grams) per 100 gals. of water when sprayed on foliage over the season. No foliage diseases occurred.

| Materials and concentration/100 gals. | Yield on 4 plots | |
|---|---|---|
| | Extra fancy | Total |
| Hexachlorophene −1.0 pt. of 10% emulsion | 76.75 | 151.70 |
| Tribasic CuSo4 4.0 lbs. Streptomycin 100 p.p.m. | 70.03 | 120.94 |
| Untreated | 48.85 | 117.42 |

While the foregoing examples are illustrative of the present invention in the control of pathogenic organisms infesting annual vegetable crops, it is applicable to the control of other Xanthomonas and Pseudomonas species which attack a wide range of field, fruit, and vegetable plants both annuals and perennials.

Typical examples of the bacterial organisms and their host plants to which this invention may be applied are set out in Table 425, on pages 498–500 of "Handbook of Biological Data" (1956), published by W. B. Saunders Co., Philadelphia, Pa.

Other common fungal parasites affecting field, orchard and forest plants are listed in this same work, Tables 426 and 427 on pages 500 to 505.

EXAMPLE NO. 11

The efficacy of hexachlorophene in controlling greasy spot on oranges was demonstrated by applying the hexachlorophene as a spray on Mar. 10. On Aug. 29, the percentage of leaves affected with greasy spot was determined. The concentration of the spray and the results are given in the following table.

| Concentration of spray hexachlorophene/100 gal.: | Percent of leaves infested after treatment |
|---|---|
| 1.—One lb. 25% wettable powder | 42.5 |
| 2.—¼ pint 25% concentrate (Formula E) | 19.00 |
| 3.—Control (no treatment) | 63.00 |

EXAMPLE NO. 12

In this test, a hexachlorophene spray was applied to the trees at a concentration of 2 oz. per 100 gallons, with the improvement in fruit quality, as set out in the following table.

| Spray applied, dates: | Percent solids in oranges at harvest, Dec. 10 |
|---|---|
| 1.—Mar. 11, June 18, Oct. 3 | 10.4 |
| 2.—Mar. 11, June 18 | 9.2 |
| 3.—Control (no spray) | 8.7 |

EXAMPLE NO. 13

In this test, the effect of a single application of hexachlorophene on the control of citrus rust-mite on grapefruit was demonstrated.

| Spray concentration hexachlorophene/100 gal.: | Avg. percent of rust-mite 40 days after spray |
|---|---|
| 1.—One lb. 25% wettable powder | 14.30 |
| 2.—¼ pint 25% concentrate (Formula E) | 6.95 |
| 3.—Control (no treatment) | 35.00 |

It should be understood, of course, that the foregoing disclosure relates only to preferred embodiments of the invention and that it is intended to cover all changes and modifications of the examples of the invention herein chosen for the purposes of the disclosure, which do not constitute departures from the spirit and scope of the invention as set forth in the claims hereof.

What is claimed is:

1. The method for combating infections in plants growing in soil infested with pathogenic micro-organisms including bacterial spot (*Xanthomonas vesicatoria*) of peppers and tomatoes, angular leaf spot (*Pseudomonas lachrymans*) and downy mildew (*Peronospora cubensis*) of cucumbers, damping off (Rhizoctonia) of beans and cabbage, and damping off and sore shin (due to Rhizoctonia) of cotton, which comprises aplying to the surfaces of said plant and to the surface of the ground adjacent thereto a composition containing as an active ingredient 2,2'-methylene bis-(3,4,6-trichlorophenol), said active ingredient being applied at an effective dosage of less than 4 ounces per acre.

2. The method according to claim 1 in which the composition is applied as an aqueous spray containing the 2,2'-methylene bis-(3,4,6-trichlorophenol) at a concentration within the range 100–1200 p.p.m.

3. The method according to claim 1 in which the composition is applied as a dust containing the 2,2'-methylene bis-(3,4,6-trichlorophenol) at a concentration of about 0.75% by weight.

4. The method of protecting a crop growing in soil infected with parasite micro-organisms including bacterial spot (*Xanthomonas vesicatoria*) of peppers and tomatoes, angular leaf spot (*Pseudomonas lachrymans*) and downy mildew (*Peronospora cubensis*) of cucumbers, damping off (Rhizoctonia) of beans and cabbage, and damping off and sore shin (due to Rhizoctonia) of cotton, which comprises applying to the upper and under surfaces of the foliage of said crop and to the surface of the soil immediately under and adjacent the plants of said crop, a bactericidal composition containing as a principal active ingredient, 2,2'-methylene-bis-(3,4,6-trichlorophenol) immediately after the primary bacterial infection period, said composition being applied at an effective rate of not more than four ounces per acre.

5. The method according to claim 4 in which the bactericidal composition is applied as an aqueous spray at a concentration of 80–250 parts per million and a rate of from 1–4 ounces percent acre of the 2,2'-methylene bis-(3,4,6-trichlorophenol).

6. The method according to claim 4 in which the bactericidal composition is applied as a dust containing about 0.75% by weight of 2,2'-methylene bis-(3,4,6-trichlorophenol) and at a rate of from 1–4 ounces per acre.

7. The method according to claim 1 wherein the pathogenic micro-organism is a bacterium and the plant is an annual vegetable.

8. The method according to claim 1 wherein plant is a cucumber.

9. The method according to claim 4 wherein said crop is an annual vegetable.

10. The method according to claim 1 wherein the plants to be protected include tomato plants, pepper plants and beans.

References Cited

UNITED STATES PATENTS

| 2,250,480 | 7/1941 | Gump | 260—619 |
| 3,346,447 | 10/1967 | Wright | 167—31 |

FOREIGN PATENTS 213,394  3/1958  Australia.

OTHER REFERENCES

Davidson et al.: Amer. Potato Journal, 24:35–39 (1947).

(Other references on following page)

OTHER REFERENCES

Spector: Handbook of Biological Data, pp. 498–505 (1956) W. B. Saunder Co. Philadelphia, Pa.

Norman: Antibiotics & Chemotherapy, 10:675–681 (1960).

Maier: Chem. Abstracts, 55:14793i (July 24, 1961).

Jones: Chem. Abstracts, 55:21446g (Oct. 16, 1961).

LEWIS GOTTS, *Primary Examiner.*

S. K. ROSE, *Assistant Examiner.*

U.S. Cl. X.R.

71—122; 424—274